US007228462B2

United States Patent
Pomaranski et al.

(10) Patent No.: US 7,228,462 B2
(45) Date of Patent: Jun. 5, 2007

(54) CLUSTER NODE STATUS DETECTION AND COMMUNICATION

(75) Inventors: Ken Gary Pomaranski, Roseville, CA (US); Andrew Harvey Barr, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 498 days.

(21) Appl. No.: 10/764,165

(22) Filed: Jan. 23, 2004

(65) Prior Publication Data

US 2005/0177779 A1    Aug. 11, 2005

(51) Int. Cl.
*G06F 11/00*    (2006.01)
(52) U.S. Cl. .......................................... 714/48; 714/55
(58) Field of Classification Search ................ 714/48, 714/39, 55
See application file for complete search history.

(56) References Cited

U.S. PATENT DOCUMENTS

| | | | | |
|---|---|---|---|---|
| 5,260,945 A * | 11/1993 | Rodeheffer | .................... | 714/4 |
| 6,272,648 B1 | 8/2001 | Findlay et al. | | |
| 6,370,656 B1 * | 4/2002 | Olarig et al. | ................. | 714/23 |
| 6,389,551 B1 | 5/2002 | Yount | | |
| 6,392,992 B1 * | 5/2002 | Phelps | ........................ | 370/225 |
| 6,442,713 B1 * | 8/2002 | Block et al. | .................. | 714/43 |
| 6,609,213 B1 | 8/2003 | Nguyen et al. | | |
| 6,654,801 B2 * | 11/2003 | Mann et al. | ................. | 709/224 |
| 6,738,811 B1 * | 5/2004 | Liang | ......................... | 709/224 |
| 6,862,695 B2 * | 3/2005 | Lin | ............................ | 714/36 |
| 2002/0027881 A1 * | 3/2002 | Castellano et al. | ......... | 370/252 |

OTHER PUBLICATIONS

Patents Act 1977: Search Report under Section 17 for Application No. GB 0501117-6.

* cited by examiner

*Primary Examiner*—Gabriel Chu

(57) ABSTRACT

One embodiment disclosed relates to a method of communicating status from a node of a cluster of computer systems. A first status signal is received from a computational node, and a default status signal is generated. The first status signal and the default status signal are used to generate a second status signal. Another embodiment disclosed relates to a method of communicating node status within a cluster of computer systems. A first signal indicative of the status of a current node is generated. A second signal indicative of the status of a preceding node is received. The first signal is transmitted to a next node if the current node is present in the cluster, and the second signal is transmitted to the next node if the current node has been removed from the cluster.

11 Claims, 8 Drawing Sheets

FIG. 3    206

CLUSTER NODE STATUS DETECTION AND COMMUNICATION

BACKGROUND OF THE INVENTION

1. Field of the Invention

The present disclosure relates generally to computer networks. More particularly, the present disclosure relates to clusters of interconnected computer systems.

2. Description of the Background Art

A cluster is a parallel or distributed system that comprises a collection of interconnected computer systems or servers that is used as a single, unified computing unit. Members of a cluster are referred to as nodes or systems. The cluster service is the collection of software on each node that manages cluster-related activity. The cluster service sees all resources as identical objects. Resource may include physical hardware devices, such as disk drives and network cards, or logical items, such as logical disk volumes, TCP/IP addresses, entire applications and databases, among other examples. A group is a collection of resources to be managed as a single unit. Generally, a group contains all of the components that are necessary for running a specific application and allowing a user to connect to the service provided by the application. Operations performed on a group typically affect all resources contained within that group. By coupling two or more servers together, clustering increases the system availability, performance, and capacity for network systems and applications.

Clustering may be used for parallel processing or parallel computing to simultaneously use two or more CPUs to execute an application or program. Clustering is a popular strategy for implementing parallel processing applications because it allows system administrators to leverage already existing computers and workstations. Because it is difficult to predict the number of requests that will be issued to a networked server, clustering is also useful for load balancing to distribute processing and communications activity evenly across a network system so that no single server is overwhelmed. If one server is running the risk of being swamped, requests may be forwarded to another clustered server with greater capacity. For example, busy Web sites may employ two or more clustered Web servers in order to employ a load balancing scheme. Clustering also provides for increased scalability by allowing new components to be added as the system load increases. In addition, clustering simplifies the management of groups of systems and their applications by allowing the system administrator to manage an entire group as a single system. Clustering may also be used to increase the fault tolerance of a network system. If one server suffers an unexpected software or hardware failure, another clustered server may assume the operations of the failed server. Thus, if any hardware of software component in the system fails, the user might experience a performance penalty, but will not lose access to the service.

Current cluster services include Microsoft Cluster Server (MSCS), designed by Microsoft Corporation for clustering for its Windows NT 4.0 and Windows 2000 Advanced Server operating systems, and Novell Netware Cluster Services (NWCS), among other examples. For instance, MSCS supports the clustering of two NT servers to provide a single highly available server.

Clustering may also be implemented in computer networks utilizing storage area networks (SAN) and similar networking environments. SAN networks allow storage systems to be shared among multiple clusters and/or servers. The storage devices in a SAN may be structured, for example, in a RAID configuration.

In order to detect system failures, clustered nodes may use a heartbeat mechanism to monitor the health of each other. A heartbeat is a signal that is sent by one clustered node to another clustered node. Heartbeat signals are typically sent over an Ethernet or similar network, where the network is also utilized for other purposes.

Failure of a node is detected when an expected heartbeat signal is not received from the node. In the event of failure of a node, the clustering software may, for example, transfer the entire resource group of the failed node to another node. A client application affected by the failure may detect the failure in the session and reconnect in the same manner as the original connection.

If a heartbeat signal is received from a node of the cluster, then that node is normally defined to be in an "up" state. In the up state, the node is presumed to be operating properly. On the other hand, if the heartbeat signal is no longer received from a node, then that node is normally defined to be in a "down" state. In the down state, the node is presumed to have failed.

SUMMARY

One embodiment disclosed herein pertains to a method of communicating status from a node of a cluster of computer systems. A first status signal is received from a computational node, and a default status signal is generated. The first status signal and the default status signal are used to generate a second status signal.

Another embodiment disclosed herein pertains to a method of communicating node status within a cluster of computer systems. A first signal indicative of the status of a current node is generated. A second signal indicative of the status of a preceding node is received. The first signal is transmitted to a next node if the current node is present in the cluster, and the second signal is transmitted to the next node if the current node has been removed from the cluster.

Another embodiment disclosed herein pertains to an apparatus for communicating status from a node of a cluster of computer systems. The apparatus includes at least an input, a default signal generator, and an output signal generator. The input is configured to receive a first status signal from a computational node, and the default signal generator is configured to produce a default status signal. The output signal generator is configured to use the first status signal and the default status signal to produce a second status signal.

Another embodiment disclosed herein pertains to an apparatus for communicating node status within a cluster of computer systems. Circuitry is configured to generate a first signal indicative of the status of a current node, and an input is configured to receive a second signal indicative of the status of a preceding node. A choosing circuit is configured to transmit the first signal to a next node if the current node is present in the cluster and to transmit the second signal to the next node if the current node has been removed from the cluster.

DETAILED DESCRIPTION

The conventional technique for reporting a state of a clustered node is described above. In the conventional technique, a heartbeat mechanism is used, and the node determined to be in either an "up" or a "down" state.

This conventional technique is insufficient and disadvantageous in various cases. For example, even if a target critical application is not functioning (i.e. the application is down), the node on which the application is running may still be transmitting its heartbeat signals. In that case, the cluster would still consider the node to be up, even though the critical application is down. In another example, the cluster may not receive an expected heartbeat signal from a node and so assume that the node is down. However, that node may actually be up (i.e. operating properly), and the missed heartbeat signal may instead be due to a failed interconnect.

Furthermore, the conventional technique typically utilizes existing circuitry to generate and transmit the status signals. This existing circuitry is also used for other communications within the cluster. In contrast, applicants have determined that using dedicated circuitry specifically designed to robustly generate and transmit status signals is advantageous over the conventional technique.

It turns out that the efficiency (percentage uptime) of a high-availability (HA) cluster is largely determined by the amount of time the cluster takes to recognize that one of its nodes has ceased performing useful computing or storage functions (i.e. when the node is effectively down). Once the cluster has determined that the node is effectively down, the clustering software can perform the necessary tasks to keep the rest of the nodes running with little interruption to user tasks.

However, as discussed above, the conventional technique used to determine the state of a cluster node is inaccurate in various cases. The conventional technique may result in either false (unnecessary) failovers, or in failed detects. Failed detects are where the cluster level software fails to switchover from a bad node to a good node when it should. Furthermore, the conventional technique often takes an undesirably long time to detect a down state of a node.

Figure 1:
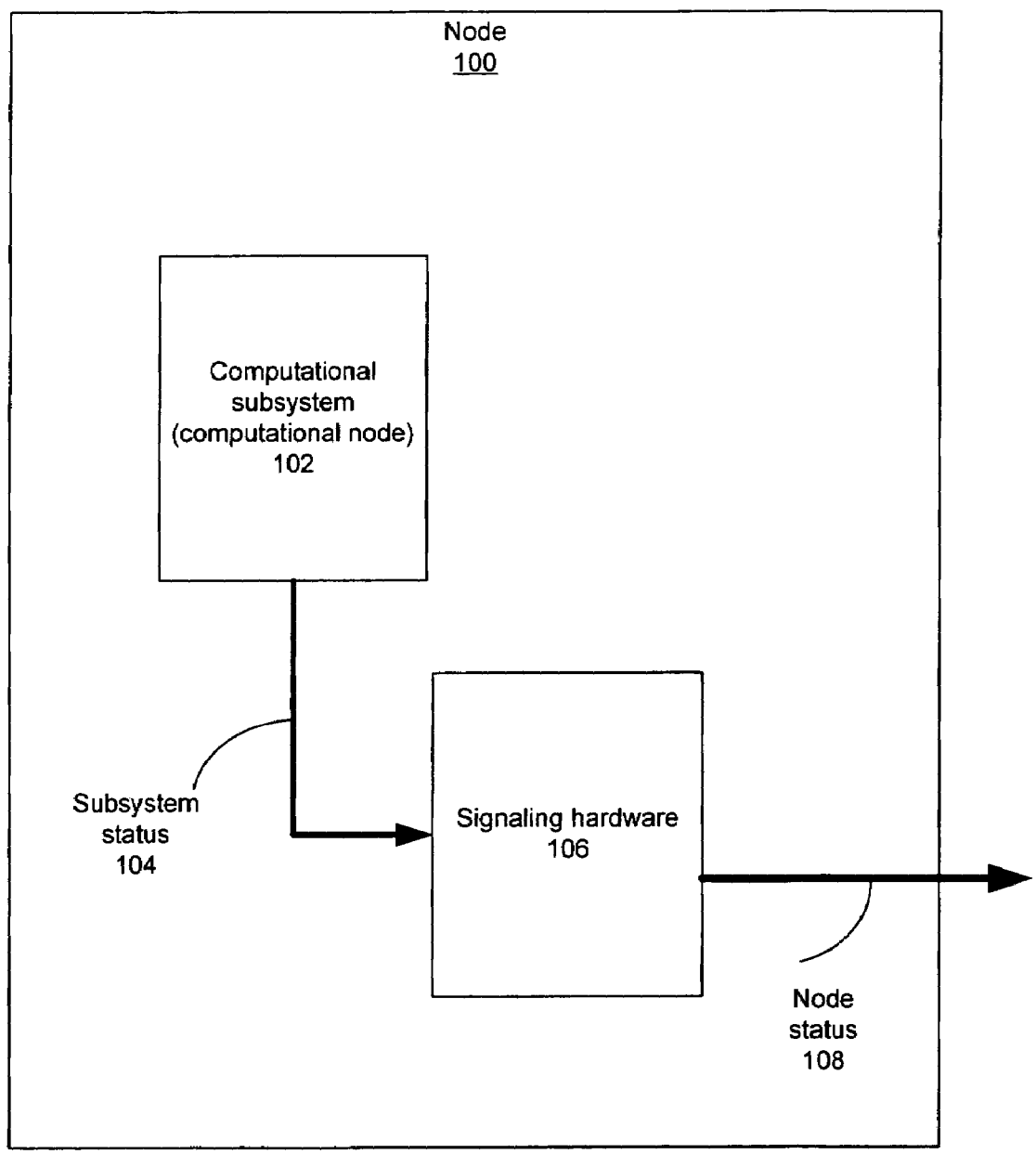
FIG. 1 is a schematic diagram depicting a node of a cluster in accordance with an embodiment of the invention.

FIG. 1 is a schematic diagram of a node 100 of a cluster in accordance with an embodiment of the invention. The node 100 includes a conventional computational subsystem 102 and signaling hardware circuitry 106. The computational subsystem 102 comprise computational elements, typically including one or more central processing units (CPUs), memory, and so on). The computational subsystem 102 generates and outputs, among other signals, a subsystem status signal 104. The signaling hardware circuitry 106 receives the subsystem status signal 104 and outputs a node status signal 108. The node status signal 108 may be output to a next node in the cluster. These signals are described further below in relation to the subsequent figures.

Figure 2:
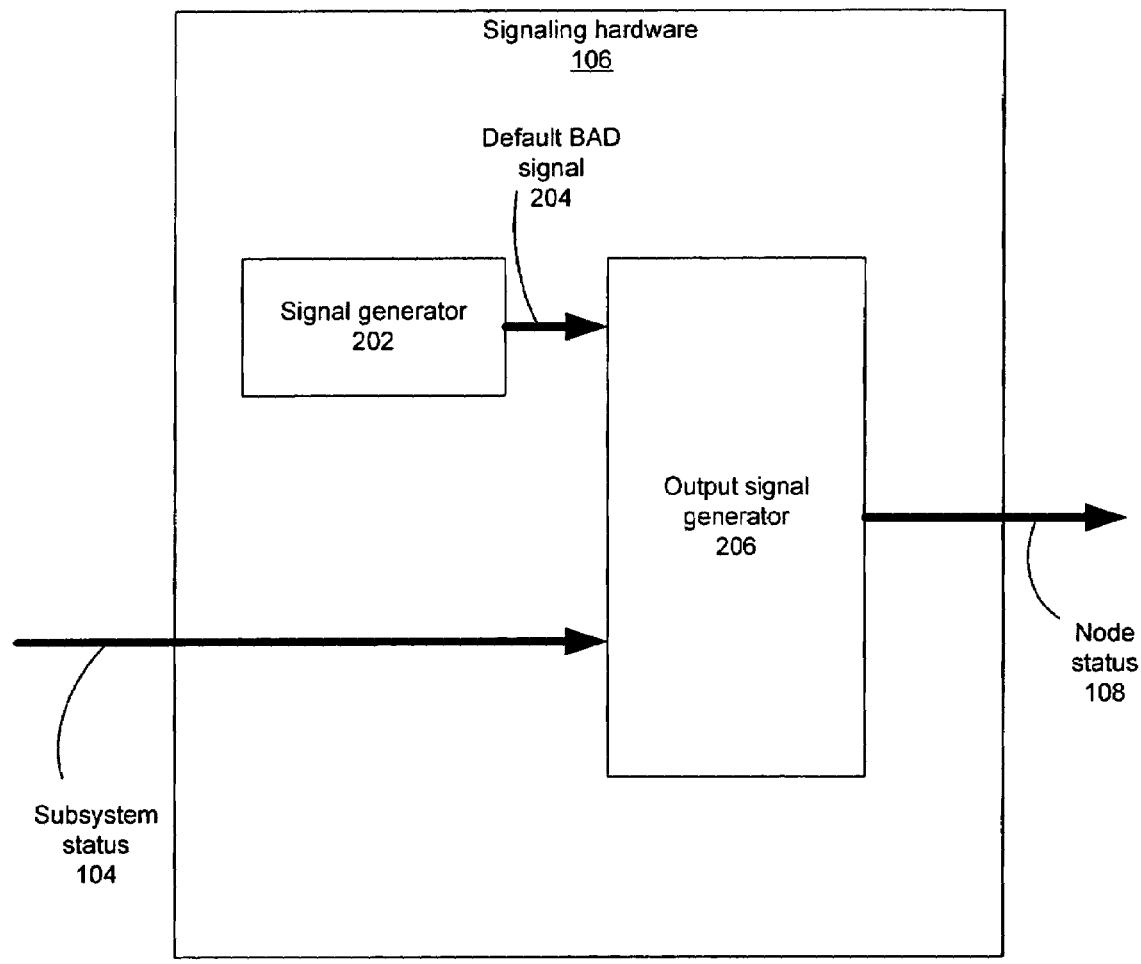
FIG. 2 is a schematic diagram of the signaling hardware in accordance with an embodiment of the invention.

FIG. 2 is a schematic diagram of the signaling hardware 106 in accordance with an embodiment of the invention. The signaling hardware 106 may include a signal generator 202 and an output signal generator 206.

Figure 4:
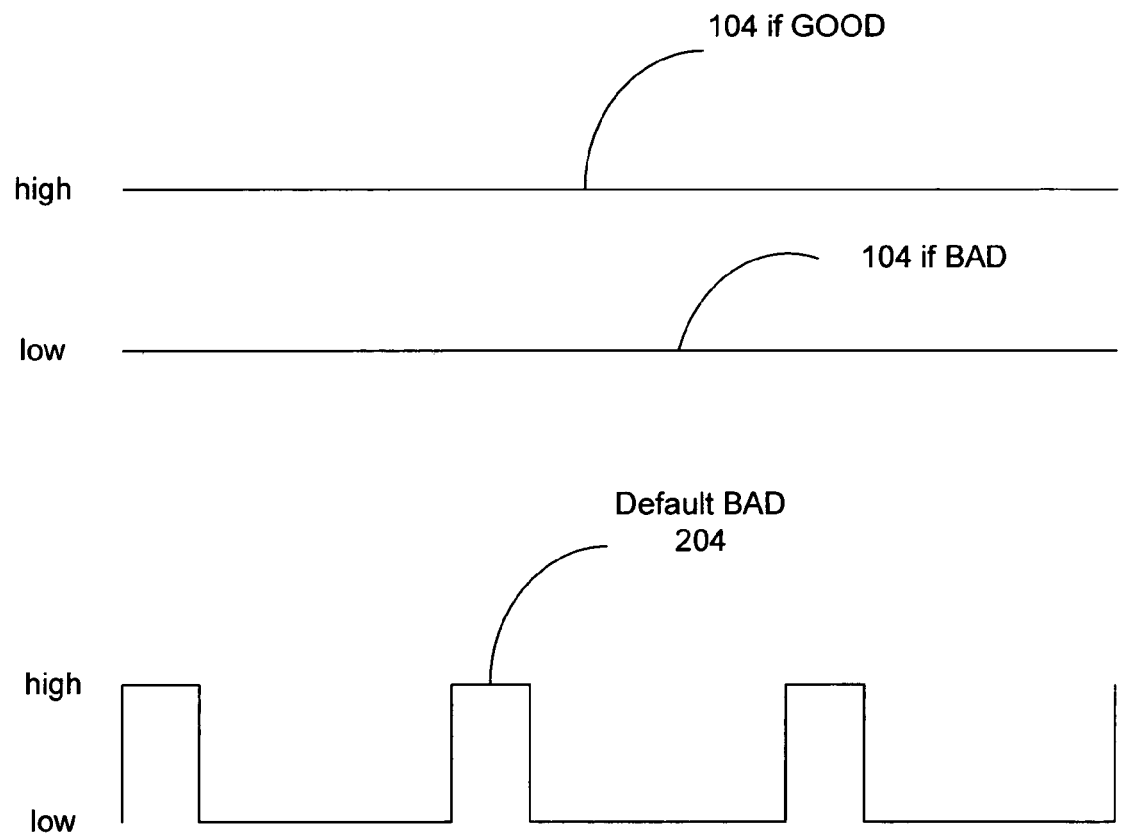
FIG. 4 depicts timing diagrams of the subsystem status signal and default BAD signal in accordance with an embodiment of the invention.

The signaling hardware 106 receives the subsystem status signal 104 from the computational node 102. Exemplary timing diagrams for the subsystem status signal 104 is shown at the top portion of FIG. 4. As depicted in FIG. 4, the subsystem status signal 104 may be in a GOOD (up) state or a BAD (down) state. For instance, the GOOD state may be represented by a high (logical 1) signal, and the BAD state may be represented by a low (logical 0) signal. If the computational subsystem 102 is functioning properly (working correctly), then the subsystem status signal 104 should be driven to the GOOD state. If the computational subsystem 102 is not functioning properly, then no GOOD state should be driven onto the subsystem status signal 104. A lack of a GOOD signal means that the system is BAD (down).

The signal generator 202 produces a default BAD (default down) signal 204. An exemplary timing diagram for the default BAD signal 204 is shown at the bottom portion of FIG. 4. As depicted in FIG. 4, the default BAD signal 204 comprises an asymmetrical periodic signal (not just a logical level). For instance, as illustrated, the default BAD signal 204 may comprise an asymmetrical toggling pattern or pulse-modulated signal. The toggling pattern shown in FIG. 4 is just an example showing one possibility. Such a toggling pattern may be generated using various electronic circuitry that is known to those of skill in the art.

The output signal generator 206 is configured to receive both the default BAD signal 204 and the subsystem status signal 104. The output signal generator 206 uses these two signals to generate and output the node status signal 108.

Figure 3:
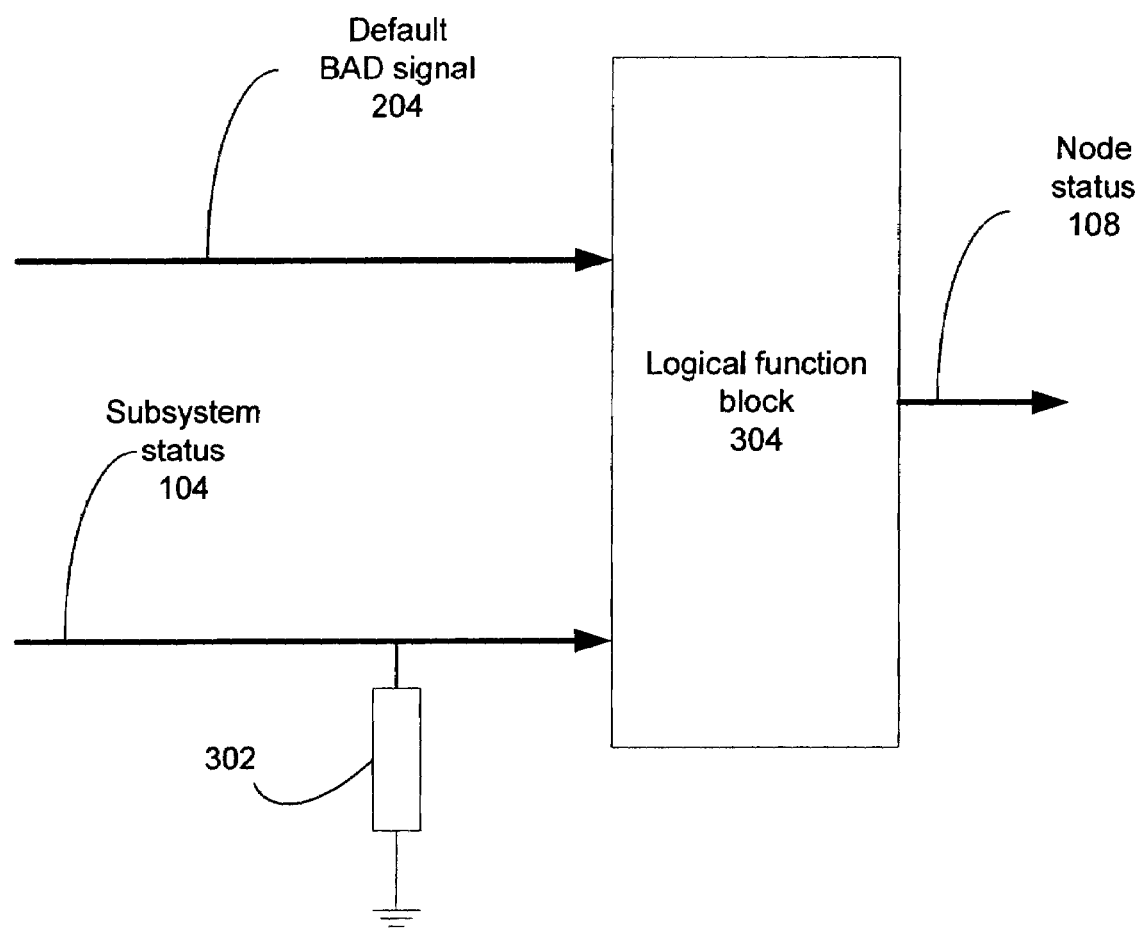
FIG. 3 is a schematic diagram of the output signal generator in accordance with an embodiment of the invention.

FIG. 3 is a schematic diagram of the output signal generator 206 in accordance with an embodiment of the invention. The output signal generator 206 may include a pull-down element 302 and a logical function block 304.

As shown in FIG. 3, the pull-down element 302 is coupled to the line receiving the subsystem status signal 104. When a high level (GOOD in this embodiment) is not driven from the computational subsystem 102, then the pull-down element 302 forces a low level (BAD in this embodiment) onto the line. Hence, the subsystem status signal 104 is advantageously pulled to a level corresponding to a BAD state even if the computational subsystem 102 does not produce any signal.

In an alternate implementation, the low level for the subsystem status signal 104 may correspond to a GOOD state, and the high level may correspond to a BAD state. In that case, a pull-up element may be used to achieve this advantageous effect. Pull-down and pull-up circuit elements (voltage-level pulling elements) are known to those of skill in the pertinent art.

As depicted in FIG. 3, the logical function block 304 receives the default. BAD signal 204 along with the subsystem status signal 104. In accordance with one embodiment, the logical function block 304 may comprise an exclusive-or (XOR) gate. In other embodiments, different functions may be utilized.

Figure 5:
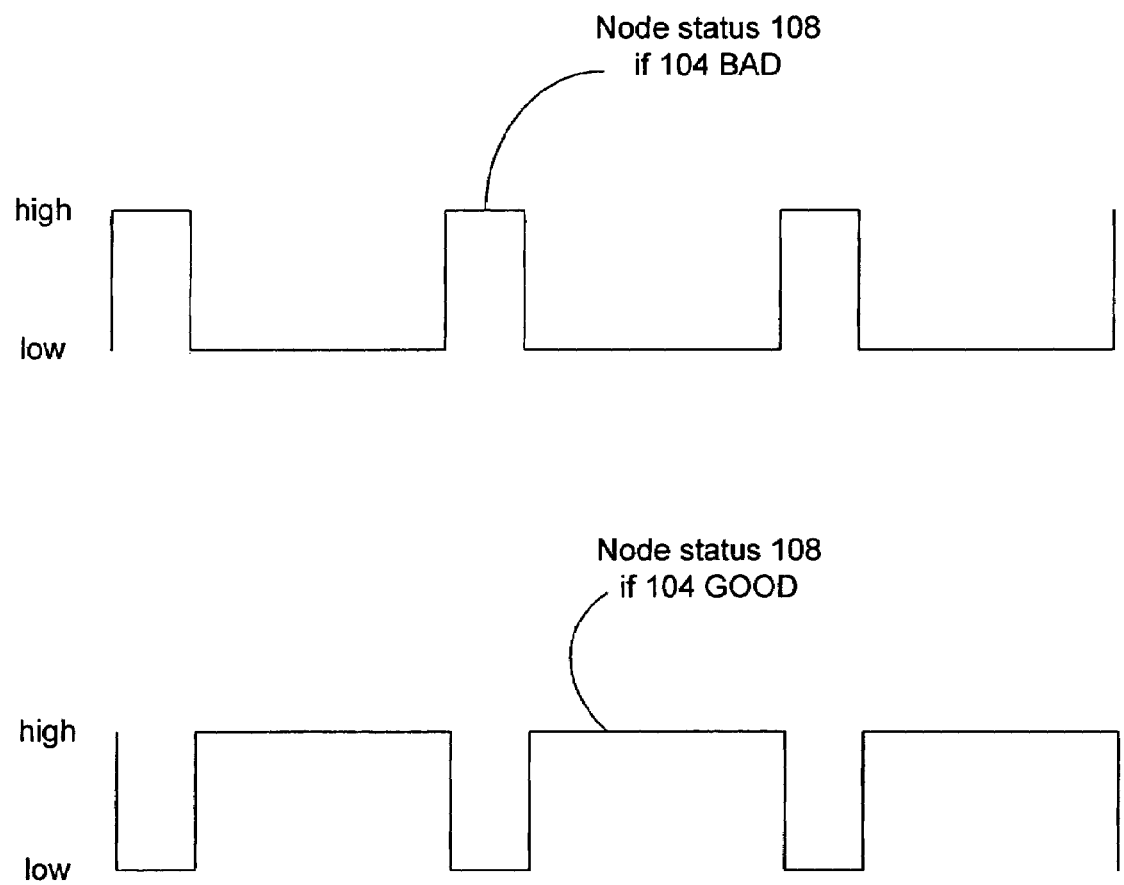
FIG. 5 depicts timing diagrams of the node status signal in accordance with an embodiment of the invention.

Exemplary timing diagrams of the node status signal 108 produced by the logical function block 304 are shown in FIG. 5. For these timing diagrams, the logical function block 304 is an XOR gate, and the signals input into the XOR gate are the signals (104 and 204) depicted in FIG. 4.

First, consider the node status signal 108 produced when the subsystem status signal 104 corresponds to a BAD state. In this case, the XOR gate receives the default BAD signal 204 and a low level for the subsystem status signal 104, and performs an exclusive-or operation on these two signals. The result is the node status signal 108 shown at the upper part of FIG. 5. In this instance, the node status signal 108 is a periodic signal representing a BAD state. More specifically, here, the node status signal 108 is of the same periodic form (toggling or pulse-modulated pattern, in this instance) as the default BAD signal 204.

Next, consider the node status signal 108 produced when the subsystem status signal 104 corresponds to a GOOD state. In this case, the XOR gate receives the default BAD signal 204 and a high level for the subsystem status signal 104, and performs an exclusive-or operation on these two signals. The result is the node status signal 108 shown at the lower part of FIG. 5. In this instance, the node status signal 108 is a periodic signal representing a GOOD state. More specifically, here, the node status signal 108 is a different periodic signal which is a complement of the default BAD signal 204.

Figure 6:
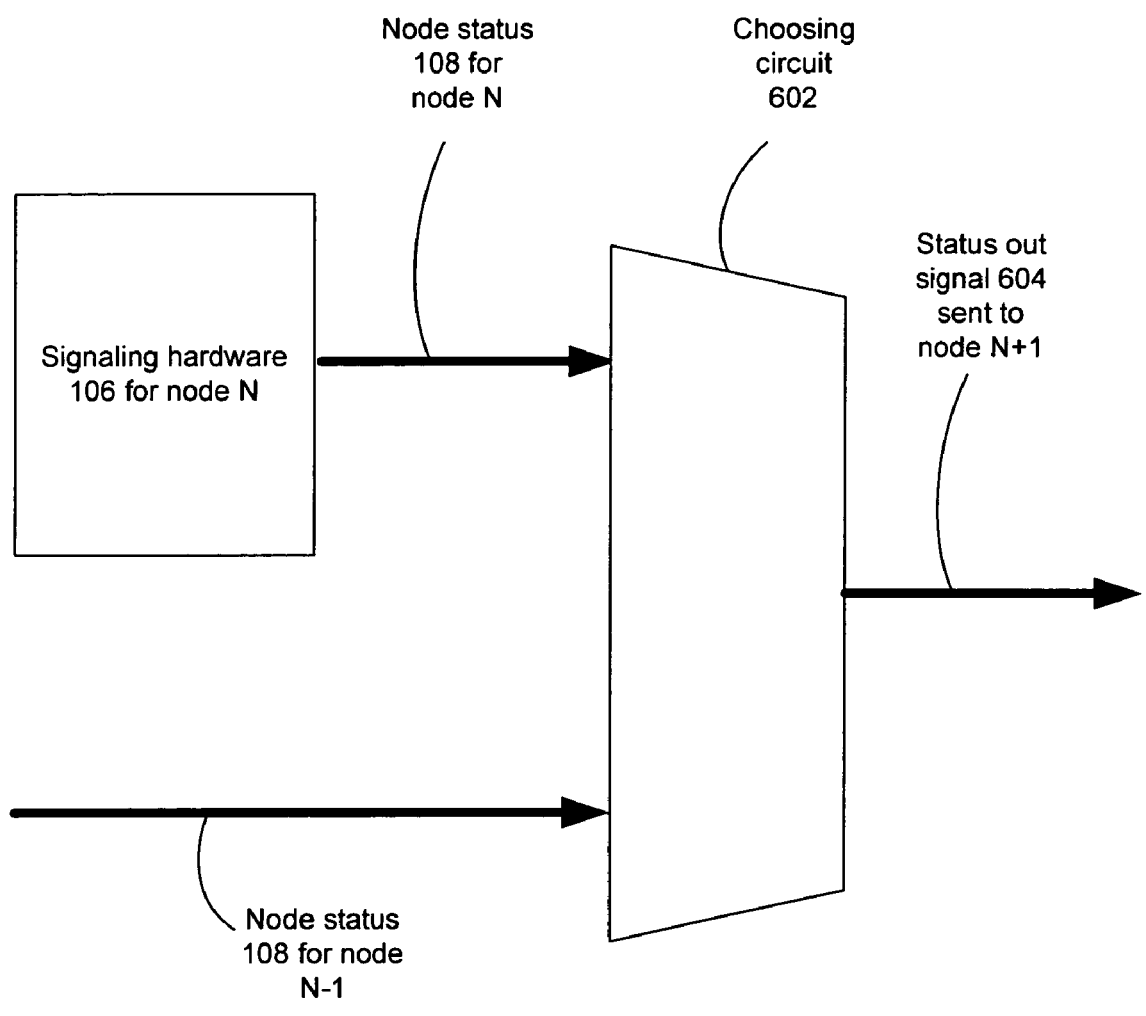
FIG. 6 is a schematic diagram of a status pass-through circuit in accordance with an embodiment of the invention.

FIG. 6 is a schematic diagram of a status pass-through circuit 600 in accordance with an embodiment of the invention. This circuit 600 advantageously allows a node status signal 108 for a preceding node to pass through a current node if the current node is down.

The signaling hardware 106 for node N produces the node status signal 108 for node N. For example, the signaling hardware 106 and node status signals 108 may be as described above in relation to the preceding figures.

A choosing circuit 602 receives the node status signal 108 for node N. In addition, the node status signal 108 from node N−1 (another node in the cluster) is received by the choosing circuit 602. The choosing circuit 602 operates on the two signals and produces a status out signal 604 that is transmitted to node N+1 (the next node in the cluster). In one embodiment the choosing circuit 602 may comprise a multiplexer (MUX) that selects one of the two status signals to pass on (via the status out signal 604) to the next node. If the computational subsystem (computational element) of node N has previously been removed from the cluster (for example, due to node failure, maintenance, or other reasons), then the status from node N−1 is passed. If the computational subsystem of node N is presently in use by the cluster, then the status of node N is passed. In this way, even if node N is down, the status of node N−1 is advantageously still evaluated by the system.

Note that if node N−1 is down, then the status signal received from node N−1 may originate from node N−2. If nodes N−1 and N−2 are both down, then the status signal received from node N−1 may originate from node N−3. And so on.

Figure 7:
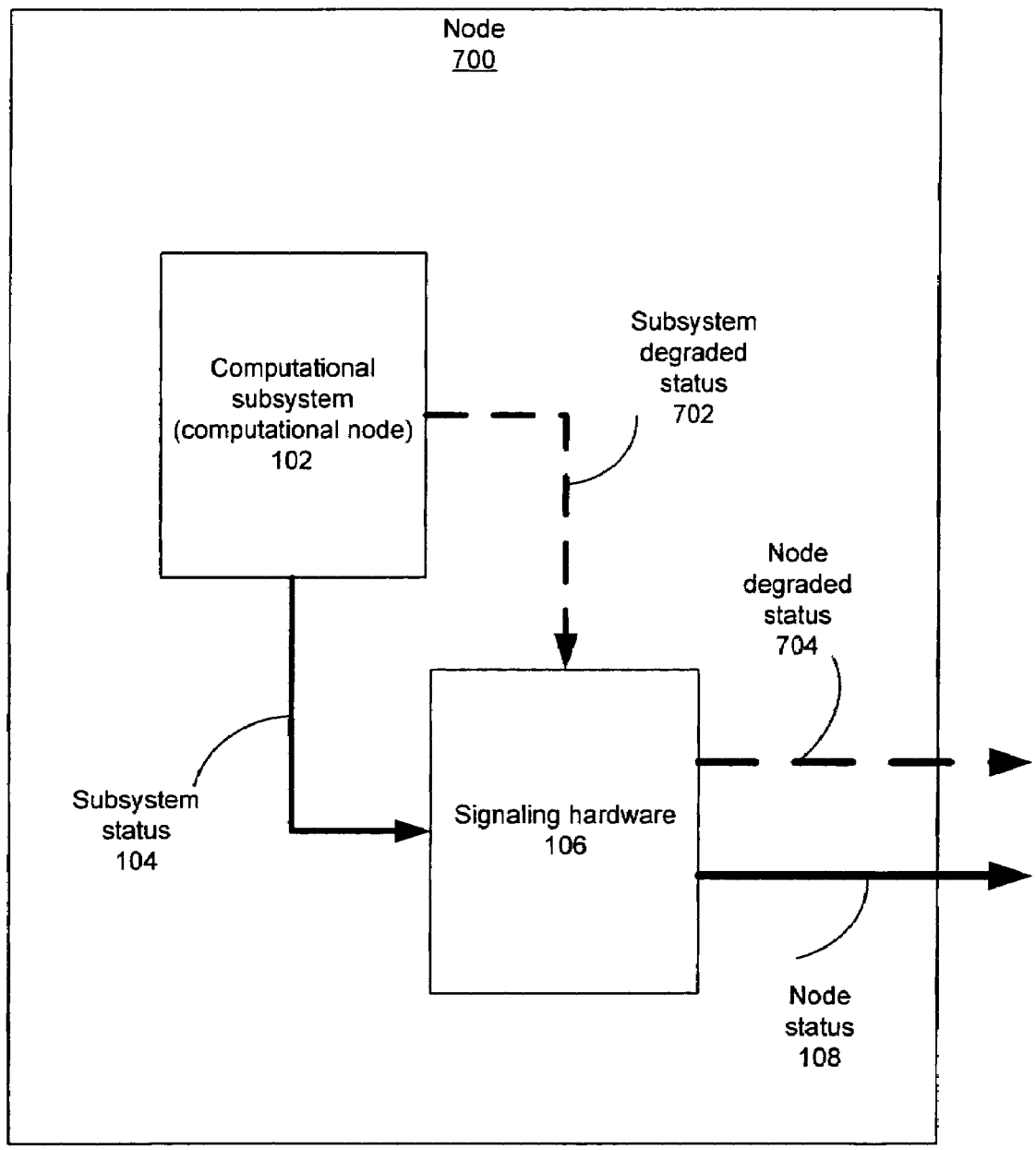
FIG. 7 is a schematic diagram of a node of a cluster in accordance with another embodiment of the invention.

FIG. 7 is a schematic diagram of a node 700 of a cluster in accordance with another embodiment of the invention. The node 700 in FIG. 7 is similar to the node 100 in FIG. 1. However, here, the node 700 generates a subsystem degraded status signal 702 in addition to the conventional subsystem status signal 104. In combination with the conventional subsystem status signal 104, the subsystem degraded status signal 702 expands the reported state from a simple binary signal to a multi-state (three-state or more) signal.

For example, the subsystem degraded status signal 702 may indicate a DEGRADED state or NOT_DEGRADED state for the computational subsystem 102. A DEGRADED state may be defined as when one or more aspects of the node is not running "up to par," so that the node may possibly be removed from the HA cluster. For example, the following rules may be used.

Rule D1: Computational subsystem loses greater than 50% performance

Rule D2: Severe (one level below critical) chassis code received

Variations of these rules and additional rules may also be used to define a DEGRADED state depending on the specific system. For example, the percentage performance prior to a degraded state being entered may differ from 50%. It may be higher, such as 75%, or lower, such as 25%.

In one embodiment, the subsystem degraded status signal 702 may be a simple flag indicating that the node is either degraded or not. In other embodiments, there may be multiple levels of degradation. These multiple levels of degradation may be implemented using multi-bit encoding of the level of degradation. In other words, instead of having just a single DEGRADED state, multiple levels of degradation may be defined by the rules. Using multiple levels of degradation would advantageously provide the HA clustering software with additional information for its decision making process as to how to manage the nodes of the cluster. For example, the degradation level may depend on the percentage performance lost.

In one specific embodiment, the node degraded status signal 704 may comprise a set of lines that provide the degraded state digitally to the next node in the HA cluster. These lines may be pulled down with resistors. One implementation may be as follows. All logical zeroes on these digital lines may indicate the node is BAD. All logical ones on these lines may indicate the node is GOOD. Other values in between may indicate the degradation level of the node, with the higher values indicating greater functioning.

Figure 8:
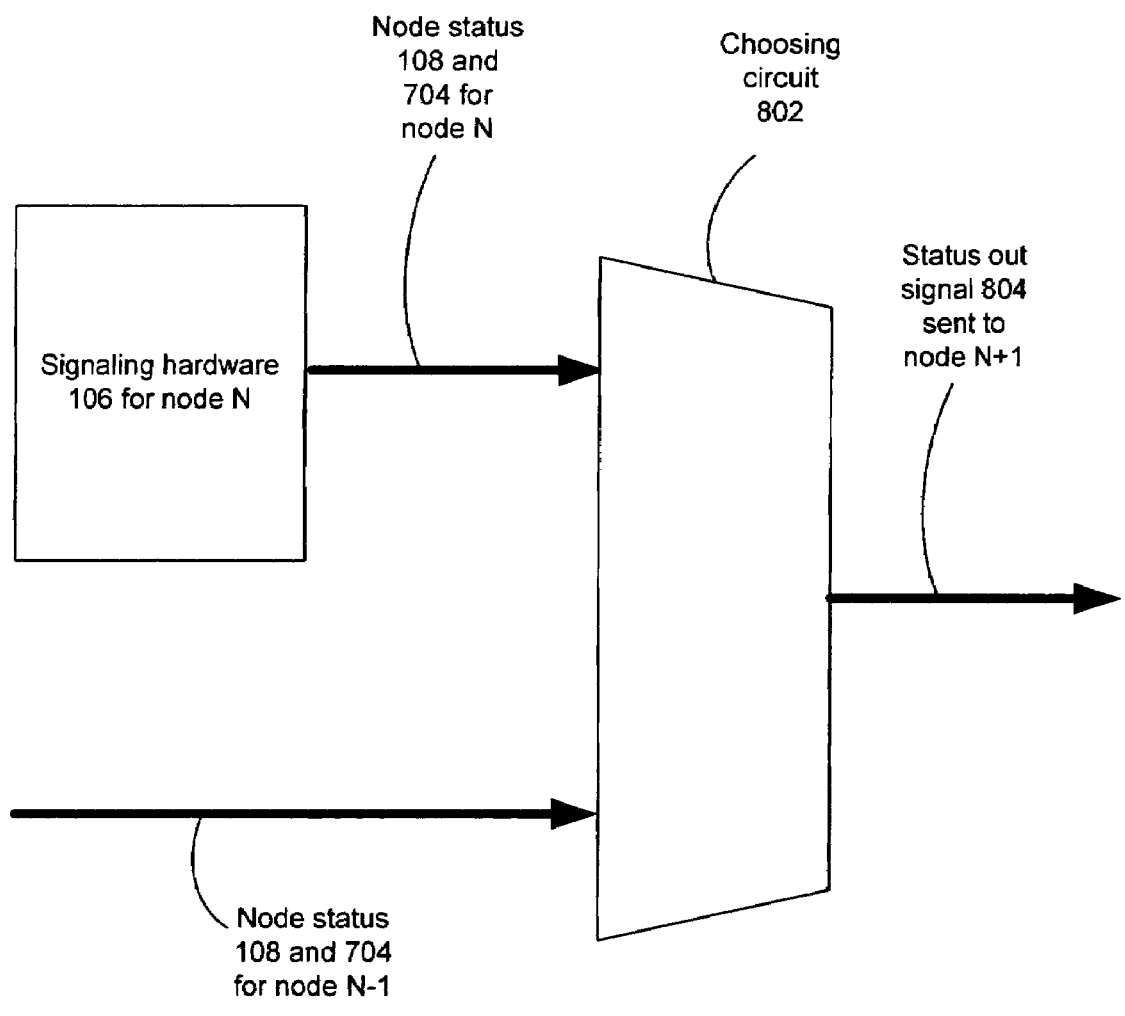
FIG. 8 is a schematic diagram of a status pass-through circuit in accordance with another embodiment of the invention.

FIG. 8 is a schematic diagram of a status pass-through circuit 800 in accordance with another embodiment of the invention. The circuit 800 in FIG. 8 is similar to the circuit 600 in FIG. 6. However, here, the choosing circuit 802 also receives the node degraded status signal 704 from nodes N and N−1.

The choosing circuit 802 operates on the input signals and produces a status out signal 804 including the additional degraded status information along with the GOOD/BAD status information from either node N or node N−1. Advantageously, this degraded status information may be utilized by the cluster level software as a "check" against the GOOD/BAD status information, resulting in a more reliable set of status information.

The above disclosure includes various advantages over the conventional art. First, the dedicated hardware is designed and used for the purpose of reliably transmitting the node status information to the cluster. This should improve the high-availability of the cluster. Second, a GOOD state is only transmitted when the appropriate software on the node is up and running and is able to signal a GOOD state. As a result, the hardware does not indicate a GOOD state when the software is down. Third, the above disclosure provides a solution to the problem of differentiating a "no heartbeat" because a node is down from a "lost heartbeat" due to a failed interconnect. This is done by providing the default BAD signal which may be modified to a GOOD signal by the working node. Fourth, the above disclosure provides a separate output for degraded type status signals, resulting in the reliable communication of such a degraded state. Moreover, the degraded status signal allows the cluster level software to use a "voting scheme" to quickly and accurately determine if a node is really down. For example, the voting scheme may utilize three signals, including the GOOD/BAD signal, the DEGRADED/NOT_DEGRADED signal, and the normal Ethernet connection provided by the cluster.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method of communicating status from a node of a cluster of computer systems, the method comprising:
    receiving a first status signal from a computational node;
    generating a default status signal; and
    using the first status signal and the default status signal to generate a second status signal, wherein if the first status signal indicates an up state, then the second status signal comprises a first periodic signal indicative of the up state, and wherein if the first status signal indicates a down state, then the second status signal comprises a second periodic signal indicative of the down state, and wherein if the first status signal indicates neither up nor down states, then the second status signal defaults to the second periodic signal.

2. The method of claim 1, wherein the first and second periodic signals comprise different toggling type signals.

3. The method of claim 2, wherein the first and second periodic signals comprise complements of each other.

4. The method of claim 1, further comprising:
    receiving a first degraded status signal from the computational node;
    generating a default degraded status signal; and
    using the first degraded status signal and the default degraded status signal to generate a second degraded status signal.

5. The method of claim 4, wherein the degraded status signals include multiple levels of degradation.

6. An apparatus for communicating status from a node of a cluster of computer systems, the apparatus comprising:
    an input configured to receive a first status signal from a computational node;
    a default signal generator configured to produce a default status signal; and
    an output signal generator configured to use the first status signal and the default status signal to produce a second status signal, wherein the output signal generator includes an exclusive-or circuit operative on the first status signal and the default status signal.

7. The apparatus of claim 6, wherein the output signal generator includes a voltage-level pulling element operative on the first status signal.

8. The apparatus of claim 6, wherein the output signal generator is further configured such that, if the first status signal indicates an up state, then the second status signal comprises a first periodic signal indicative of the up state, and, if the first status signal indicates a down state, then the second status signal comprises a second periodic signal indicative of the down state.

9. The apparatus of claim 8, wherein the output signal generator is further configured such that, if the first status signal indicates neither up nor down states, then the second status signal defaults to the second periodic signal.

10. The apparatus of claim 9, wherein the first and second periodic signals comprise different toggling type signals.

11. The apparatus of claim 10, wherein the first and second periodic signals comprise complements of each other.

* * * * *